United States Patent [19]
Muller

[11] 3,958,671
[45] May 25, 1976

[54] HYDRODYNAMIC BRAKE SYSTEM

[75] Inventor: Helmut Muller, Heidenheim (Brenz), Germany

[73] Assignee: Voith Getriebe KG, Heidenheim (Brenz), Germany

[22] Filed: Dec. 5, 1974

[21] Appl. No.: 530,041

[30] Foreign Application Priority Data

Dec. 8, 1973 Germany............................ 2361351

[52] U.S. Cl.................................. 188/274; 60/337; 60/347; 188/296
[51] Int. Cl.² .................... F16F 9/42; F16D 57/04; F16D 65/78
[58] Field of Search........ 188/290, 296, 274, 264 E; 60/337, 347, 357, 359

[56] References Cited
UNITED STATES PATENTS

| | | | |
|---|---|---|---|
| 2,517,531 | 8/1950 | Anderson.......................... | 188/296 X |
| 2,733,778 | 2/1956 | LaMater et al...................... | 188/296 |
| 2,963,118 | 12/1960 | Booth et al. .......................... | 188/274 |
| 3,045,430 | 7/1962 | Becker.................................. | 60/337 |
| 3,744,598 | 7/1973 | Hanke.................................. | 188/296 |
| 3,774,735 | 11/1973 | Hanke et al. .......................... | 188/296 |

FOREIGN PATENTS OR APPLICATIONS 1,032,677 6/1958 Germany.......................... 188/264 E

*Primary Examiner*—George E. A. Halvosa
*Attorney, Agent, or Firm*—Michael J. Striker

[57] ABSTRACT

A hydrodynamic brake system for the wheel of a vehicle, particularly for the non-driven wheel of a trailer, forms an integral unit which is installed within the confines of the wheel rim at one side of the hub. The stator of the brake system is mounted on the non-rotating axle for the wheel, and the rotor of the brake system is connected with a reservoir for a supply of hydraulic brake fluid and is rotated by the hub and/or rim. The reservoir is connected by discrete feeding and evacuating conduits with a toroidal working chamber which is defined by the stator and rotor, and a portion of the reservoir is exposed to the surrounding atmosphere so as to promote the cooling of brake fluid therein. The brake fluid is forced into the chamber via feeding conduit and from the chamber back into the reservoir via evacuating conduits in response to admission of compressed gas into the reservoir whereby the fluid is heated in the chamber when the admission of gas takes place while the wheel rotates the rotor relative to the stator.

17 Claims, 4 Drawing Figures

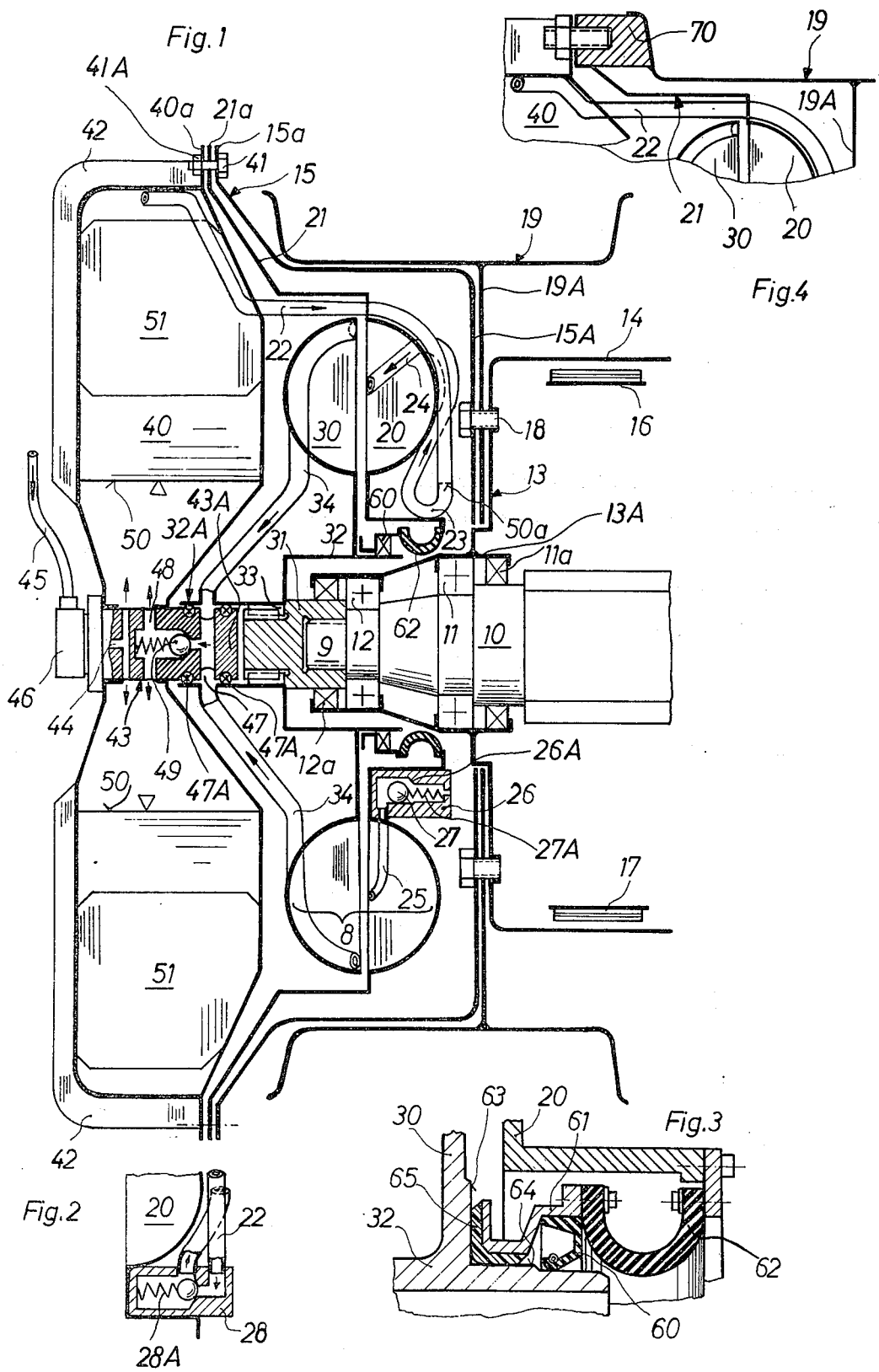

HYDRODYNAMIC BRAKE SYSTEM

BACKGROUND OF THE INVENTION

The present invention relates to improvements in hydrodynamic retarder or brake systems, especially to improvements in hydrodynamic brake systems for wheels or analogous rotary parts which are not or need not be driven by motors, engines or other types of prime movers. Examples of such rotary parts are certain wheels of aircraft, certain wheels of automotive land vehicles and the wheels of trailers which can be hitched to tractors, trucks or other types of towing vehicles.

A hydrodynamic brake system for the wheels of vehicles or the like comprises a bladed stator and a bladed rotor which latter defines with the stator a toroidal working chamber for a hydraulic brake fluid. In many instance, the stator and the rotor of a hydrodynamic brake system are mounted within the confines of the wheel (i.e., they do not extend axially beyond the rim which carries the tire) and are coaxial with the wheel. The brake system further comprises a reservoir for brake fluid, conduit means which connects the reservoir with the working chamber to provide a path for circulation of the fluid, a heat exchanger installed in the conduit means and serving to cool the fluid on its way from and back into the working chamber, and means for admitting compressed air into the reservoir to thus compel the fluid to flow into the working chamber when the system is to produce a braking action. The intensity of the breaking action depends on the extent to which the working chamber is filled with hydraulic fluid while the rotor rotates relative to the stator.

German Offenlegungsschrift No. 2,158,872 discloses a hydrodynamic brake system wherein a shaft which drives the rotor rotates independently of the wheel to be braked. The torque-transmitting connection between the hub of the wheel and the shaft for the rotor of the brake system includes a planetary transmission which insures that the rotational speed of the rotor greatly exceeds the rotational speed of the wheel. This enhances the torque absorption capability of the brake system; however, a speed increaser (especially a planetary transmission) contributes significantly to the bulk as well as the initial and maintenance cost of the brake system, not only because the transmission is expensive but also because the brake system must employ a discrete shaft for the rotor and reliable bearings for the shaft. Moreover, the wheel must include a specially designed hub which can accommodate the stator and the rotor, i.e., the wheel cannot be assembled of standard components. This, in turn, normally necessitates the provision of specially designed bearings for the modified hub. The just discussed publication does not describe the heat exchanger, the reservoir for brake fluid and/or the means for forcing brake fluid into the working chamber; however, the design of the wheel, stator, rotor and planetary transmission is such that the non-illustrated reservoir, heat exchanger and means for forcing the fluid into the working chamber cannot find adequate room within the confines of the wheel, i.e., they are probably remote from the wheel. Reference may be had to U.S. Pat. No. 2,963,118 to Booth et al. which discloses a hydrodynamic-brake system wherein the reservoir, the heat exchanger and the means for forcing compressed air into the reservoir are remote from the housing for the stator and rotor means of the brake system.

SUMMARY OF THE INVENTION

An object of the invention is to provide a relatively simple and inexpensive but highly effective hydrodynamic brake system which is especially suited for the retardation or slowing-down of rotary parts which are not positively driven by a prime mover or the like.

Another object of the invention is to provide a hydrodynamic brake system which is sufficiently compact to be installed, in its entirety, within the confines of a wheel, e.g., the wheel of a trailer, and which can be mounted in or associated with standard wheels.

A further object of the invention is to provide a hydrodynamic brake system which need not employ a discrete heat exchanger, i.e., which need not include a part that performs only the function of withdrawing heat from hydraulic brake fluid.

An additional object of the invention is to provide a brake system whose mounting in or on a wheel to be braked does not necessitate the use of special bearings for the wheel, which can be rapidly attached to or detached from a wheel, and which can receive compressed air or another gaseous fluid from a source that is normally available in or on a vehicle or group of vehicles whose wheel or wheels must be retarded by hydrodynamic brake fluid.

The invention is embodied in the combination of a rotary member (particularly a non-driven or idler wheel for use on vehicles, preferably automotive land vehicles or aircraft and most preferably trailers which can be hitched to trucks or other types of towing vehicles) with a novel hydrodynamic brake system which comprises a stator coaxial with the wheel and preferably connected to a stationary (non-rotating) axle for the hub of the wheel, a rotor which is coaxial with the stator and defines therewith a preferably toroidal working chamber, a reservoir which is preferably coaxial with the rotor and contains a supply of hydraulic brake fluid, means for fastening the reservoir and the rotor to the hub and/or rim of the rotary member, conduit means connecting the chamber with the reservoir to define a closed path for circulation of brake fluid from the reservoir into the chamber and back into the reservoir whereby the fluid is heated during flow through the chamber when the rotor is rotated relative to the stator, and means for admitting into the reservoir a compressed gas to thereby initiate the circulation of brake fluid along the closed path. In accordance with a feature of the invention, the reservoir is at least partially exposed to the surrounding atmosphere so that the wind which sweeps along the exposed part of the reservoir cools the brake fluid therein, i.e., the reservoir constitutes a heat exchanger for brake fluid and insures reliable cooling of brake fluid not only during braking (i.e., when the reservoir receives compressed gas) but also during the intervals between successive applications of the brake system when the brake fluid is expelled from the chamber and is stored only in the reservoir.

The reservoir is preferably adjacent to the working chamber and the stator is preferably installed between the rotor and the reservoir. It is preferred to center the stator to the reservoir (e.g., to a centrally located core of the reservoir) so that the stator, rotor, reservoir and conduit means form an integral unit which can be readily and rapidly attached to or detached from the wheel and its axle as well as from the means for admitting compressed gas.

The novel features which are considered as characteristic of the invention are set forth in particular in the appended claims. The improved brake system itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic axial sectional view of a wheel and of the improved hydrodynamic brake system;

FIG. 2 is a fragmentary axial sectional view of the rotor of the brake system and an axial sectional view of a pressure regulating valve installed in a feeding conduit;

FIG. 3 is an enlarged view of a detail in FIG. 1, showing the construction of sealing means between the stator and rotor of the brake system; and FIG. 4 is a fragmentary axial sectional view of the wheel and of the rotor of the brake system being directly connected to the wheel.

DESCRIPTION OF THE PREFERRED EMBODIMENTS

Referring first to FIG. 1, there is shown a portion of a wheel for a trailer which may be a semitrailer or a fourwheel trailer adapted to be hitched to a truck, tractor or another towing vehicle. The wheel is not positively driven, i.e., it rotates solely as a result of frictional engagement with the road surface when the towing vehicle is in motion. The hub 13 of the wheel is rotatable on two antifriction roller bearings 11, 12 surrounding a non-rotating axle 10 of the trailer. The end portions of the sleeve-like central portion 13A of the hub 13 surround suitable sealing elements 11a, 12a which prevent escape of lubricant for the bearings 11, 12. The radially outermost portion of the hub 13 constitutes or is rigidly connected with an annular drum 14 forming part of a friction brake which further includes brake shoes 16 and 17. An intermediate portion of the hub 13 is connected with an annular rim 19 by means of screws 18 or analogous fasteners. The tire on the rim 19 is not shown in the drawing. The wheel of FIG. 1 is a single wheel, i.e., the hub 13 supports a single rim for a single tire.

The improved hydrodynamic brake or retarder system comprises a rotor 20 (rotary blade ring) which is driven by the hub 13 of the wheel, a stator 30 (stationary blade ring) which is outwardly adjacent to the rotor 20, and a reservoir 40 for a supply of hydrodynamic brake fluid, preferably a non-volatile liquid lubricant. The blade rings are designed similar to those shown in FIG. 5 of U.S. Pat. No. 2,790,518 to Wilson. The entire brake system constitutes a self-contained integral unit which is separably mounted in part on the axle 10 and in part on the hub 13 of the wheel. The means for fastening the rotor 20 and reservoir 40 to the hub 13 comprises a ring-shaped supporting member or carrier 15 having an apertured disk-shaped inner portion 15A which is adjacent to the outer side of the median portion of the hub 13 and is secured thereto by means of the aforementioned fasteners 18. As shown in FIG. 1, the median portion of the hub 13 and the inner portion 15A of the carrier 15 flank and are concentric with an apertured disk-shaped inner portion 19A of the rim 19. The carrier 15 resembles a cup and its marginal portion 15a constitutes an out-turned flange which is inwardly adjacent to a similar flange 21a of an annular shell 21 constituting a portion of the rotor 20 and surrounding the stator 30. The flange 21a is disposed between the flange 15a and a flange 40a which forms part of the reservoir 40. The flanges 15a, 21a, 40a are rigidly connected to each other by an annulus of fasteners including bolts 41 which mesh with nuts 41A. It will be seen that the fasteners 18, 41, 41A compel the components 15, 20, 40 of the hydrodynamic brake system to rotate with the wheel.

If desired, as shown in FIG. 4, the rim 19 may be directly connected with the rotor 20 and/or 40 and then constitute one component of the means for fastening the rotor and reservoir to the hub 13. For that purpose, the rim 19 may comprise a support ring 70.

The stator 30 is affixed to the non-rotating axle 10 as follows: The outer end portion 9 of the axle 10 is externally threaded and meshes with an internally threaded coupling element or connector 31 which is further formed with external threads in mesh with the internal threads 33 of a central portion or "hub" 32 of the stator 30.

The reservoir 40 is preferably a relatively flat (as considered in the axial direction of the wheel) rotary vessel the exposed surfaces of which are preferably provided with suitably configurated cooling ribs or fins 42. In FIG. 1, the cooling ribs 42 are provided on the peripheral surface (which is outwardly adjacent to the flange 40a) and on the left-hand surface (which faces away from the stator 30) of the reservoir 40. It will be noted that the stator 30 is disposed between the rotor 20 and reservoir 40. The central portion or core 43 of the reservoir 40 is coaxial with the connector 31 as well as with the central portion 32 of the stator 30 and has a passage 44 for admission of compressed air supplied by a stationary pipe 45 via stationary header means 46 separably mounted on the outermost portion of the core 43 so that the latter can rotate relative to the parts 45, 46. The inner portion 43A of the core 43 (i.e., that portion which is nearest to the outer end portion 9 of the axle 10) is received and can rotate in a tubular extension 32A of the central portion 32 of the stator 30. The extension 32A and sealing elements 47A form a means for yieldingly centering the stator 30 to the reservoir 40 and hence to the rotor 20, when the brake system is detached from the wheel. The inner portion 43A has a circumferentially complete peripheral groove 47 which communicates with the interior of the reservoir 40 by way of several bores or ports 48 in response to opening of a check valve 49. The illustrated check valve 49 is a simple ball check valve which is mounted in the inner portion 43A of the core 43 and whose spherical valve member is urged against a conical seat by a helical spring which reacts against an internal shoulder of the portion 43A but yields when the pressure of brake fluid in the stator 30 reaches a predetermined value.

The groove 47 and ports 48 constitute a portion of a passage which connects the working chamber 8 of the brake system with the interior of the reservoir 40. Another portion of such passage is defined by at least one conduit 34 (FIG. 1 shows two conduits 34) connecting the working chamber 8 with the groove 47. The just discussed passage permits evacuation of brake fluid from the chamber 8, i.e., it admits brake fluid into the reservoir 40 when the check valve 49 is open. The inlets of the evacuating conduits 34 communicate with the radially outermost portion of that part of the working chamber 8 which is defined by the stator 30, i.e., the brake fluid which leaves the chamber 8 via conduits 34 must flow inwardly toward the axis of the core 43 before it reaches the groove 47. The latter is flanked by two ring-shaped sealing elements 47A which are installed between the inner portion 43A and the extension 32A of the central portion 32 of the stator 30.

The intake end of a feeding conduit 22 which admits brake fluid into the working chamber 8 communicates with the radially outermost portion of the interior of the reservoir 40, and the conduit 22 thereupon extends radially inwardly into the space between the shell 21 and inner portion 15A of the carrier 15, i.e., along the inner side of the rotor 20, to a locus 23 which is relatively close to the axis of the wheel. At the locus 23, the conduit 22 forms a loop and thereupon extends radially outwardly. The discharge end 24 of the conduit 22 admits brake fluid into that portion of the working chamber 8 which is defined by the rotor 20. It will be noted that the discharge end 24 is inclined inwardly, i.e., toward the axis of the brake system, so that the stream of brake fluid issuing from the conduit 22 has a first component of flow radially inwardly toward the axis of the rotor 20 and a second component of flow which is directed toward the stator 30 and is parallel to the axis of the axle 10.

A valve which performs the function of valve 49 shown in FIG. 1 is disclosed in French Pat. No. 2,089,390. The valve 49 prevents compressed air from entering the working chamber 8 via conduits 34; however, it allows brake fluid to flow from the working chamber 8 into the reservoir 40 as soon as the pressure of brake fluid in the chamber 8 exceeds the pressure of air in the reservoir 40 plus the bias of the helical spring in the valve 49. The valve 49 opens as soon as the chamber 8 is filled with brake fluid to a certain extent because the fluid which enters the chamber 8 is subjected to a very pronounced pressurizing action.

The valve 49 acts as a check valve for the compressed gas which enters the reservoir 40 via pipe 45. However, and since the gas assists the helical spring of the valve 49 in tending to maintain the spherical element of this valve in sealing engagement with its seat, the valve 49 simultaneously performs the function of regulating the extent to which the chamber 8 is filled with brake fluid and hence the intensity of the braking action as a function of the pressure of gas in the reservoir 40. The pressure of gas which is admitted via pipe 45 can be regulated by the driver, e.g., by means of a pedal or lever. If the pedal or lever is moved in a direction to increase the gas pressure in the reservoir 40, the spherical element of the valve 49 moves nearer to its seat and the valve 49 acts as a flow restrictor which throttles the flow of brake fluid from the conduits 34 into the reservoir. Therefore, the working chamber 8 is filled to a greater extent and the system furnishes a more pronounced braking action.

If the rotational speed of the wheel increases, the braking action becomes more pronounced. As a result of that the fluid pressure in the conduits 34 rises and/or the energy of the fluid increases. The fluid flowing in the conduits 34 then moves the spherical element of the valve 49 in a direction away from its seat. Thus, the braking action decreases because the valve 49 allows a greater quantity of fluid to flow from the chamber 8 into the reservoir 40; the unintentional intensification of braking action as a result of increased RPM of the wheel is automatically compensated for by a reduction of the extent to which the chamber 8 is filled with brake fluid. It will be seen that the valve 49, in combination with the means for admitting compressed gas via pipe 45, can perform all functions which are needed to accurately regulate the braking operation.

When the rotational speed of the wheel reaches or exceeds a predetermined value, the supply of brake fluid forms in the reservoir 40 an annulus which is adjacent to the flange 40a and whose internal surface (shown at 50 in FIG. 1) is remote from the core 43. The formation of such annular body of brake fluid can be promoted by installing in the reservoir 40 a set of substantially radially extending partitions or vanes 51 whose outer edge faces are spaced apart from the peripheral wall of the reservoir. As a rule, the annular body of brake fluid will develop only when the rotational speed of the wheel (and rotor 20) is sufficient to render the brake system operative. In fact, the control unit of the brake system is preferably designed in such a way that the brake system can operate only when the fluid in the reservoir 40 forms an annulus.

Since the intake end of the conduit 22 communicates with the outermost part of the interior of the reservoir 40, it receives brake fluid which fills it only to the line 50a, i.e., to a point whose distance from the axis of the brake system equals the radius of the internal surface 50 of the annular body of brake fluid in the reservoir. Thus, the loop which the conduit 22 defines at the locus 23 is not filled with brake fluid and the working chamber 8 can receive such fluid from the reservoir 40 only when the pressure in the radially innermost portion of the interior of the reservoir 40 increases in response to admission of compressed air via pipe 45 and header means 46.

In order to insure rapid evacuation of air from (i.e., a deaeration of) the working chamber 8 when the latter receives brake fluid via conduit 22, and rapid filling of the chamber 8 with air (aeration) when the check valve 49 is open, the brake system comprises a pipe 25 which communicates with the interior of the rotor 20 and contains an air admitting or evacuating valve 26. The valve member 27 of the valve 26 is a ball which is biased by a helical spring 27A so that it is normally held out of contact with a conical valve seat 26A in the housing or body of the valve. Thus, the interior of the rotor 20 is normally free to communicate with the interior of the carrier 15 via pipe 25 and open valve 26. This valve closes when the ball 27 is urged against the seat 26A by brake fluid. The ball 27 remains spaced apart from the seat 26A as long as only air flows through the pipe 25.

FIG. 2 shows a pressure regulating valve 28 which is installed in the conduit 22 at the inner side of the rotor 20. This valve is necessary when the locus 23 is not sufficiently close to the wheel axis, i.e., if the distance between the radially innermost portion of the conduit 22 and the axis of the wheel is greater than necessary to prevent the flow of brake fluid from the reservoir 40 into the rotor 20 while the space within the annular body of brake fluid in the reservoir is maintained at atmospheric pressure. The bias of the valve spring 28A of the valve 28 shown in FIG. 2 is such that the valve 28 opens only when the pressure of air in the reservoir 40 rises to or exceeds a predetermined value.

In order to insure that the brake system will be capable of providing a substantial braking effort at relatively low wheel speeds, the blades of the stator 30 and rotor 20 are preferably inclined with respect to the wheel axis and consist of thin sheet material, preferably a metallic sheet stock. The channels between the blades of the stator 30 and rotor 20 are preferably designed with a view to promote the conversion of torque into heat. An important design feature which promotes the flow of brake fluid in the torque converter is the provision of a working chamber 8 having a substantially circular cross-sectional outline (see FIG. 1).

It can happen that the rotary components (especially the reservoir 40 and the rotor 20) are not exactly concentric with the wheel hub 13, e.g., due to absence of exact concentricity of the carrier 15 with the hub. In order to compensate for such (eventual) absence of exact concentricity, the sealing means between the stator 30 and rotor 20 is preferably designed in a manner as shown in FIG. 3. The sealing means comprises a ring 60 having a substantially U-shaped cross-sectional outline and mounted in an annular holder 61 which is secured to the rotor 20 through the medium of an elastic annular coupling element 62. The stator 30 has a flat radially extending first surface 63 which is sealingly engaged by a first portion of the rotating holder 61, and a cylindrical second surface 64 which is sealingly engaged by a second portion of the holder 61. Those portions of the holder 61 which slide along the surface 63, 64 of the stator 30 are preferably provided with liners 65 consisting of wear-resistant material, e.g., a suitable synthetic plastic substance. The just described sealing means is immediately adjacent to the central portion 32 of the stator 30; it is disposed between two coaxial ring-shaped portions of the stator 30 and rotor 20 and seals the radially innermost part of the working chamber 8.

The operation is as follows:

The check valve 49 is normally closed because the spring urges the spherical valve member against the conical seat in the portion 43A of the core 43 of the reservoir 40. If the operator of the towing vehicle desires to apply the improved hydrodynamic brake system, the pipe 45 is connected with a suitable source of compressed air (e.g., in response to depression of a pedal or in response to pivoting of a lever) whereby the pressure within the annular body of brake fluid in the reservoir 40 increases. Such pressure assists the spring of the check valve 49 in holding the valve member in sealing engagement with the seat. Moreover, compressed air which is admitted via pipe 45 and header means 46 forces the brake fluid to flow from the reservoir 40 into the rotor 20 via conduit 22, i.e., the working chamber begins to receive brake fluid and such fluid immediately closes the valve 26 in the pipe 25 as soon as the pipe 25 evacuates the last trace of air from the channels of the stator 30 and rotor 20. The pressure of brake fluid in the chamber 8 rises considerably so that the check valve 49 opens immediately and completes a path for the circulation of brake fluid from the chamber 8, through the evacuating conduits 34, through the reservoir 40, through the feeding conduit 22, and back into the chamber 8. Thus, the brake fluid circulates even though the system does not employ a pump.

If the pressure in the reservoir 40 increases further in response to admission of additional compressed air via pipe 45, the extent to which the working chamber 8 is filled with brake fluid must increase in order that the pressurized brake fluid can maintain the check valve 49 in open position to thus allow for continuous circulation of such fluid along the closed path defined by 40, 22, 20, 30, 34, 49 and 48. In other words, the intensity of braking action can be varied (increased or reduced) by the simple expedient of varying the pressure of air in the reservoir 40. This feature is disclosed in U.S. Pat. No. 2,963,118 Booth et al; however, the liquid reservoir 32 of the patented brake system does not define a portion of an endless path for circulation of brake fluid. Instead, the patented brake system employs a discrete heat exchanger 18 which is always filled with brake fluid and does not rotate with the wheel.

Since the intake end of the conduit 22 communicates with the outermost part of the interior of the reservoir 40, the entire body of brake fluid is being recirculated as soon as the pipe 45 admits compressed air. The aforedescribed configuration of the conduit 22 at the locus 23 (with or without the provision of the valve 28, depending upon the distance between the locus 23 and the axis of the wheel) insures that the brake fluid remains in the reservoir 40 when the air filling the central portion of the interior of the reservoir (within the annular body of brake fluid) is maintained at atmospheric pressure. The valve 28 will be used if, owing to the design of the wheel, the innermost portion of the conduit 22 is not located nearer to the axis of the wheel than the internal surface 50 of the body of brake fluid in the reservoir 40. The aforedescribed inclination of the discharge end 24 of the conduit 22 in the rotor 20 is desirable and advantageous. This discharge end supplies brake fluid into the outer part of the rotor 20, i.e., into that part wherein the distance between the neighboring rotor blades (as considered in the circumferential direction of the rotor) is greater than in the radially innermost region of the working chamber 8. Consequently, the resistance to flow of brake fluid in that channel of the rotor 20 into which the conduit 22 discharges is relatively low.

The mounting of the intake ends of conduits 34 in such a way that they are located in the radially outermost portion of the stator 30 and face the adjacent portions of the rotor 20 enhances the circulation of brake fluid when the system is in use. The sealing elements 47A are necessary because the inner portion of the core 43 rotates whereas the conduits 34 are stationary. If desired, the conduits 34 can be mounted in parallelism with the wheel axis, i.e., one end of each of these conduits then communicates directly with that portion of the working chamber 8 which is defined by the rotor 20 and the other end with the reservoir 40. The thus mounted conduits 34 then rotate with the parts 20, 40 so that the sealing elements 47A, groove 47, ports 48 and check valve 49 can be dispensed with.

An important advantage of the improved brake system is that the rotor 20 is secured directly to the hub 13 of the wheel. This renders it possible to dispense with the planetary transmission or analogous complex torque-transmitting means between the wheel and the rotor. Instead of increasing the absorption capability of the brake system by increasing the speed of the rotor, the improved brake system relies for higher absorption capability on other factors which, at a rotor speed equal to the wheel speed and at a rotor diameter which is determined by the diameter of the rim 19, enhance the braking effort. Such factors include the design of the stator 30 and rotor 20 and hence the configuration of the working chamber 8, especially a working chamber with a circular cross-sectional outline, thin stator and rotor blades which are inclined with respect to the wheel axis, fluid flow enhancing configuration and surfaces of means which define passages for the flow of brake fluid in a closed circuit, and an optimum ratio between the inner and outer diameters of the working chamber.

Owing to the fact that the improved brake system need not employ one or more planetary transmissions or analogous speed increases for the rotor, the reservoir of the thus greatly simplified and less expensive brake system can be installed, at least in part, in the space which is normally occupied by the speed increaser. Thus, and as shown in FIG. 1, at least the major part of the preferably flat ring-shaped reservoir 40 can be installed within the confines of the wheel, and this reservoir can rotate with the rotor of the brake system, i.e., with and at the speed of the wheel. It is within the purview of the invention to connect the reservoir 40 directly to a part (e.g., 13 or 19) of the wheel. However, the provision of the aforementioned carrier 15 (which supports the rotor 20 and the reservoir 40 and is directly attached to the hub 13 and rim 19) renders it possible to insure an optimum utilization of the space which is available within the confines of the wheel and to configurate the reservoir with a view to completely fill that portion of the space at the outer aide of the hub 13 which remains available upon reception of the parts 20 and 30. The placing of the major part of or the entire receptacle within the confines of the wheel, combined with the feature that the reservoir rotates with the wheel, renders it possible to greatly simplify the conduits between the reservoir and the working chamber. The outer diameter of the reservoir 40 preferably exceeds the outer diameter of the working chamber 8 and the extent to which the reservoir projects axially outwardly beyond the wheel depends to a certain degree on the desired cooling action, i.e., on the desired area of the outer surface which is to come in direct contact with surrounding air.

The extent to which the reservoir projects beyond the wheel also depends, to a degree, on the configuration of the wheel and on the desired volume of the reservoir.

The just discussed feature (that the reservoir is in direct contact with surrounding air) renders it possible to dispense with a discrete heat exchanger because such function is performed by the reservoir in a highly efficient manner, especially if the surface or surfaces which are exposed to wind are provided with heat dissipating ribs and/or fins. It has been found that the dimensions of the reservoir can be readily selected with a view to insure that the reservoir can temporarily store substantial amounts of heat which is fully dissipated during the intervals between successive applications of the brake system, especially when the reservoir has one or more finned or ribbed exposed surfaces. For the just described reasons, the reservoir preferably flanks the outer side of the working chamber opposite the hub 13.

German Offenlegungsschrift No. 1,755,818 discloses a hydrodynamic brake system wherein the reservoir for brake fluid forms part of the cooling circuit. However, the brake system of this publication employs a discrete cooling device for brake fluid, and the cooling device as well as the reservoir are remote and separable from the working chamber. Moreover, the just mentioned conventional brake system further employs a complex control unit and a circulating pump for brake fluid; the pump and the control unit are also remote and separable from the parts which define the working chamber. In contrast to such complex and bulky brake system, the system of the present invention can be constructed as an integral unit with built-in conduitry for the circulation of brake fluid between the working chamber and the reservoir (heat exchanger). Consequently, the conduits 22, 34 need not extend beyond the confines of the wheel, the improved brake system need not include a pump, and the reservoir need not contain a spring-biased fluid-displacing piston of the type shown (at 33) in FIG. 1 of U.S. Pat. No. 2,963,118 to Booth et al. In other words, the reservoir can be assigned primarily with a view to function as an effective heat exchanger for brake fluid.

The working chamber 8 receives brake fluid solely in response to admission of compressed air or another gas into the reservoir 40. When the brake system is applied, the fluid is circulated through the working chamber 8 and reservoir 40 due to pumping action of the rotor 20 (in a manner somewhat similar to that disclosed in the aforementioned patent to Booth et al). The rotor 20 also serves as a means for evacuating brake fluid from the working chamber 8 in response to completed application of the brake system.

The mounting of the stator 30 directly on the non-rotating axle 10 for the wheel also contributes to simplicity and compactness of the improved brake system. Such non-rotating axles (on which the wheels rotate) are used in all or nearly all types of trailers. As mentioned above, the improved brake system can be used with particular advantage in trailers or semitrailers, regardless of whether the trailer is hitched to the towing vehicle by a fifth wheel or in another suitable way. The brake system will be used with preference on simple wheels for trailers or the like because the outer side of a single wheel (having a single tire) is sufficiently removed from the outermost lateral part of the trailer to permit that a portion of the brake system (especially the reservoir 40) may extend outwardly beyond the outline of the wheel. The brake system can be installed on the wheels of existing trailers without any or with minimal modifications of the wheels. Thus, all that is necessary is to connect the carrier 15 to the hub 13 of a vehicle, to place the rotor 20 into the carrier 15, to mount the stator 30 on the axle 10, and to connect the reservoir 40 to the shell 21 of the rotor and/or to the carrier.

If the improved brake system is used for retardation of twin wheels having two rims and two tires, the working chamber 8 can be mounted within the confines of one rim and the reservoir 40 at least partly within the confines of the other rim.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters patent is set forth in the appended claims:

1. The combination of a rotary member, particularly an idler wheel for use on vehicles, with a hydrodynamic brake system comprising a stator coaxial with said rotary member; a rotor coaxial with said stator and defining therewith a toroidal working chamber; a reservoir forming a substantially closed pressure vessel coaxial with said rotor; means for fastening said reservoir and said rotor to said rotary member for rotation therewith, said reservoir being partially filled with brake fluid so that the latter forms an annulus having a substantially cylindrical internal surface in response to rotation of said rotary member at a speed exceeding a predetermined value; conduit means connecting said chamber with said reservoir to define a closed path for circulation of brake fluid from said reservoir into said chamber and back into said reservoir whereby the fluid is heated while flowing through said chamber when said rotor rotates relative to said stator, at least a portion of said reservoir being exposed to the surrounding atmosphere to promote the cooling of brake fluid therein, said conduit means comprising a conduit which feeds brake fluid to said chamber and has an intake end communicating with said reservoir radially outwardly of said internal surface and a discharge end in the interior of said rotor, and at least one evacuating surface which admits brake fluid from said chamber to said reservoir, said evacuating conduit having an intake end facing said rotor and communicating with that portion of said chamber which is remotest from the axis of said rotor, and a discharge end; means for admitting into said reservoir a compressed gas to thereby initiate the circulation of brake fluid along said path; and normally closed check valve means disposed between said discharge end of said evacuating conduit and said reservoir and arranged to open in response to a predetermined fluid pressure in said chamber.

2. The combination of claim 1, wherein said reservoir is adjacent to said working chamber.

3. The combination of claim 1, further comprising a stationary axle for said rotary member and means for connecting said stator to said axle.

4. The combination of claim 1, wherein said stator is disposed between said rotor and said reservoir.

5. The combination of claim 4 wherein said fastening means comprises an annular shell connecting said rotor with said reservoir and surrounding said stator.

6. The combination of claim 1, the distance between said feed conduit discharge end and the axis of said rotary member exceeding the radius of said internal surface and said feed conduit further comprising an intermediate portion which is nearer to said axis than said internal surface so that said intermediate portion is not filled with brake fluid in the absence of admission of compressed gas into said reservoir.

7. The combination of claim 1, and further comprising normally closed valve means provided in an intermediate portion of said feed conduit and arranged to open in response to a predetermined pressure of brake fluid in said feed conduit upstream of said valve.

8. The combination of claim 7, wherein said intermediate portion of said feed conduit is nearer to the axis of said rotary member than said intake and discharge ends thereof.

9. The combination of claim 1, wherein said feed conduit discharge end is inclined toward the axis of said rotary member.

10. The combination of claim 1, wherein said valve means has a seat, a valve member, and a valve spring for biasing said valve member against said seat whereby said valve member prevents the flow of brake fluid from said chamber into said reservoir when the fluid pressure in said chamber is less than said predetermined pressure.

11. The combination of claim 10, wherein said reservoir has at least one port for admission of compressed gas into said valve means so that the compressed gas assists said spring in urging said valve member against said seat whereby said valve member offers a greater resistance to movement away from said seat when said reservoir receives compressed gas than when the brake fluid in said reservoir is maintained at atmospheric pressure.

12. The combination of claim 1, further comprising a combined aerating and deaerating valve for said chamber, said valve being normally open and being closed by pressurized brake fluid in response to admission of compressed gas into said reservoir.

13. The combination of claim 1, wherein said rotor and said stator have ring-shaped inner portions coaxial with and adjacent to each other, and further comprising sealing means interposed between said inner portions of said stator and said rotor.

14. The combination of claim 13, wherein said sealing means comprises an elastic coupling element secured to said inner portion of said rotor, a ring sealingly engaging the inner portion of said stator, and means for mounting said ring on said coupling element.

15. The combination of claim 1, wherein said rotary member comprises a hub and a rim surrounding said hub, said fastening means comprising a carrier, means for securing said carrier to said hub, and means for securing said rotor and said reservoir to said carrier.

16. The combination of claim 15, wherein said rotor, said stator and at least a portion of said reservoir are disposed within the confines on said rim at one side of said hub.

17. The combination of claim 1, wherein said rotary member comprises a hub and a rim surrounding said hub, said rim forming part of said fastening means and directly supporting said rotor and said reservoir.

* * * * *